(No Model.)
A. T. PHILLIPS.
HAND RAKE.
No. 259,714. Patented June 20, 1882.
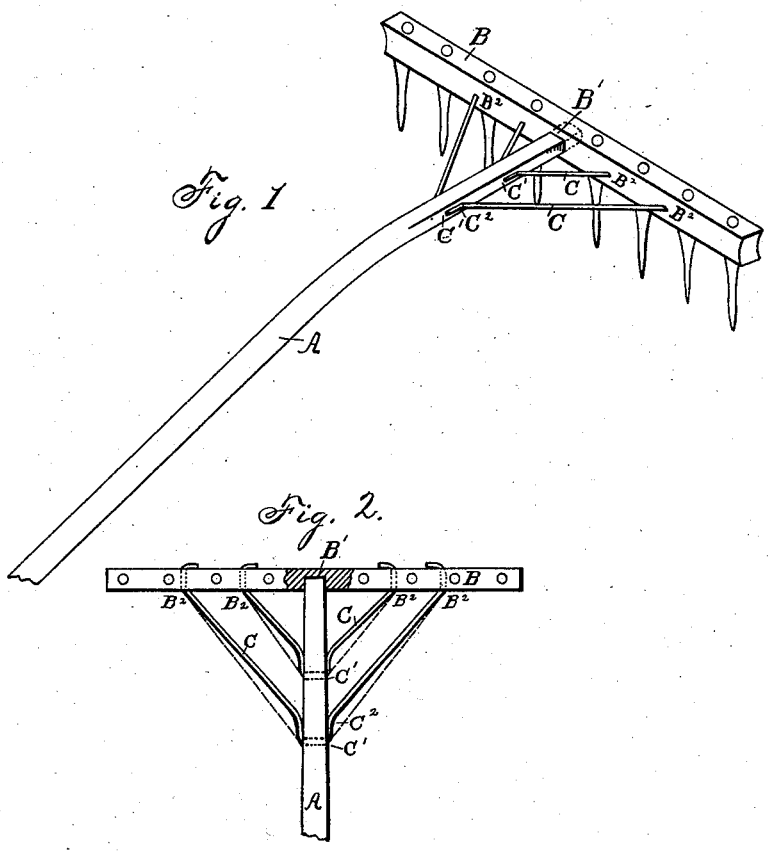
WITNESSES
Samuel E. Thomas
J. Edward Warren
INVENTOR
Alvah T. Phillips
By W. W. Leggett
Attorney

UNITED STATES PATENT OFFICE.

ALVAH T. PHILLIPS, OF MILFORD, MICHIGAN.

HAND-RAKE.

SPECIFICATION forming part of Letters Patent No. 259,714, dated June 20, 1882.

Application filed January 14, 1882. (No model.)

*To all whom it may concern:*

Be it known that I, ALVAH T. PHILLIPS, of Milford, county of Oakland, State of Michigan, have invented a new and useful Improvement in Hand-Rakes; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter described, and more particularly pointed out in the claim.

In the drawings, Figure 1 is a perspective view of a rake embodying my invention. Fig. 2 is a plan view looking down on the top of the rake and representing a part in section.

Referring to the drawings, A represents the handle; B, the rake-head; B', the point where the handle is mortised into the head, and C the wire braces. These latter are passed through the handle at C'. They then take a straight course, as represented by the dotted lines, from C' to B², the point where they pass through the rake-head, and are then clinched at B³, as shown. Now, in order to take up all slack and to bring all the parts to a firm bearing, the wire braces are cramped, as shown at C², in against the sides of the rake-handle. It is apparent that by this construction the handle cannot pass through the head at B', and the braces cannot slide through the handle, and are necessarily taut.

I prefer to cramp or kink the wire, as described, adjacent to the handle, as shown; but it is apparent that the slack may be taken up by a kink made at any point between C' and B², thereby making the brace taut.

This rake possesses the advantages of straight braces and non-liability of the handle to become loose in the head from either lateral or longitudinal strain.

I am aware that a hand-rake has been provided with straight braces passed in a straight line through the handle, clinched on the outside of the head, and cramped against the opposite sides of the handle, the handle being mortised through the head; and I do not claim a rake so constructed, broadly.

What I claim is—

A hand-rake consisting of a rake head and handle mortised into but not through the head, and, in combination therewith, one or more wire braces passed through the handle, thence in a straight line to and through the head, beyond which they are clinched, said wires being crimped by forcing them in against the sides of the handle adjacent to the points where they pass through the latter, substantially as described.

In testimony whereof I sign this specification in the presence of two witnesses.

ALVAH T. PHILLIPS.

Witnesses:
J. EDWARD WARREN,
SAMUEL E. THOMAS.